US012449768B2

(12) United States Patent
Favez et al.

(10) Patent No.: US 12,449,768 B2
(45) Date of Patent: Oct. 21, 2025

(54) HOROLOGY COMPONENT

(71) Applicant: ROLEX SA, Geneva (CH)

(72) Inventors: Denis Favez, Le Grand-Saconnex (CH); Stefano Hénin, Saint-Prex (CH)

(73) Assignee: ROLEX SA, Geneva (CH)

( * ) Notice: Subject to any disclaimer, the term of this patent is extended or adjusted under 35 U.S.C. 154(b) by 695 days.

(21) Appl. No.: 17/026,330

(22) Filed: Sep. 21, 2020

(65) Prior Publication Data

US 2021/0088972 A1 Mar. 25, 2021

(30) Foreign Application Priority Data

Sep. 24, 2019 (EP) .................................... 19199142

(51) Int. Cl.
*G04B 15/14* (2006.01)
*G04B 13/02* (2006.01)
*G04B 17/04* (2006.01)
*G04B 17/06* (2006.01)

(52) U.S. Cl.
CPC ............ *G04B 15/14* (2013.01); *G04B 13/02* (2013.01); *G04B 13/021* (2013.01); *G04B 17/045* (2013.01); *G04B 17/066* (2013.01)

(58) Field of Classification Search
CPC .... G04B 13/021; G04B 17/066; G04B 15/14; G04B 13/02; G04B 17/045
USPC .......................................................... 368/327
See application file for complete search history.

(56) References Cited

U.S. PATENT DOCUMENTS 4,087,960 A * 5/1978 Koichi .................. G04C 10/02 368/232
10,372,083 B2 8/2019 Tobenas Borron
2007/0008828 A1* 1/2007 Takasawa ............. G04B 19/06 368/232
2007/0195651 A1* 8/2007 Kawakami ............. C23C 28/42 368/232
2008/0159083 A1* 7/2008 Kawakami ............ G04B 19/12 368/232
2015/0185701 A1* 7/2015 Tobenas Borron .. G04B 17/066 427/419.7
2017/0121538 A1 5/2017 Mesa, Jr. et al.
2017/0371300 A1* 12/2017 Ikeda ..................... C25D 13/12
2018/0143591 A1* 5/2018 Di Domenico ..... B81C 1/00603
2018/0181071 A1* 6/2018 Spassov .............. C23C 14/0676
(Continued)

FOREIGN PATENT DOCUMENTS

CH 702576 A2 7/2011
CH 709705 A1 11/2015
(Continued)

OTHER PUBLICATIONS

European Search Report and Written Opinion dated Mar. 20, 2020 in counterpart application No. EP19199142; with English machine translation (total 13 pages).
(Continued)

*Primary Examiner* — Edwin A. Leon
*Assistant Examiner* — Kevin Andrew Johnston
(74) *Attorney, Agent, or Firm* — Seckel IP, PLLC

(57) ABSTRACT

A horology component based on a fragile material, wherein said component comprises at least one surface part of fragile material covered with a coating (10) comprising at least two layers CE of elastic material (11) separated by a layer CR of a material (12) stronger than the elastic material (11).

23 Claims, 3 Drawing Sheets

(56) References Cited

U.S. PATENT DOCUMENTS

| | | | | |
|---|---|---|---|---|
| 2018/0217558 | A1 * | 8/2018 | Furusato ................ | G04B 37/22 |
| 2019/0271947 | A1 | 9/2019 | Tobenas Borron | |

FOREIGN PATENT DOCUMENTS

| | | | | |
|---|---|---|---|---|
| CN | 104583880 | A | 4/2015 | |
| CN | 205777082 | U | 12/2016 | |
| CN | 107857951 | A | 3/2018 | |
| EP | 3002638 | A2 * | 4/2016 | ........... G04B 17/066 |
| EP | 3037893 | A1 | 8/2020 | |
| JP | 2004-131752 | A | 4/2004 | |
| JP | 2015-522152 | A | 8/2015 | |
| WO | 2014006229 | A1 | 1/2014 | |

OTHER PUBLICATIONS

Chinese Office Action and Search Report dated Jan. 26, 2024 in counterpart application No. CN 2020110180491; with English machine translation (total 13 pages) (note: U.S. Pat. No. 20070008828 and U.S. Pat. No. 4087960, D2 and D3 in the CN Search Report are not listed in this IDS since they are already of record in the application).

Japnese Office Action and Search Report dated Aug. 20, 2024 in counterpart application No. JP 2020-157686; with English machine translation (total 8 pages).

* cited by examiner

HOROLOGY COMPONENT

This application claims priority of European patent application No. EP19199142.1 filed Sep. 24, 2019, the content of which is hereby incorporated by reference herein in its entirety.

The present invention relates to a horology component made from a fragile material, notably silicon. It also relates to a horology movement and to a timepiece, notably a wristwatch, comprising at least one such horology component.

Silicon is a material that offers numerous advantages in the manufacture of horology components. On the one hand, it allows a large number of small-sized parts to be manufactured simultaneously with micrometric precision. On the other hand, it has a low density and a diamagnetic nature. This material does, however, have a disadvantage: it has little or no plastic-deformation domain, as it is in fact a relatively brittle material. Mechanical stress or impact may cause the component to break. This fragility of horology components made of silicon is accentuated by the fact that they are cut from a silicon substrate, generally by a deep etching technique, for example deep reactive ion etching (DRIE). A specific feature of this type of etching is that it forms openings, the flanks of which are lightly grooved so that the etched surface exhibits a lack of flatness in the form of ripples known as "scalloping". This means that the etched flanks have a certain roughness that lowers the mechanical strength of the component. Furthermore, the lack of flatness may generate crack initiators, particularly in the event of mechanical stressing, and lead to component breakage. If a horology component made of silicon breaks while within a horology movement, the result is not only that the horology movement no longer operates, but also that a great amount of silicon debris, originating from the broken horology component, scatters through the horology movement.

It is an object of the present invention to propose a horology component that does not have the disadvantages of the prior art.

More specifically, it is a first object of the invention to propose a horology component that does not produce a great amount of scattered debris if it should break.

To this end, the invention relies upon a horology component based on a fragile material, wherein said component comprises at least one part of the surface of fragile material covered with a coating comprising at least two layers of elastic material separated by a layer CR of a material stronger than the elastic material.

The invention is more specifically defined by the claims.

These objects, features and advantages of the present invention will be set out in detail in the following description of particular embodiments given by way of nonlimiting example in connection with the attached figures among which:

FIG. 1 schematically depicts a horology component in section according to a first embodiment of the invention.

FIG. 2 schematically depicts a horology component in section according to a second embodiment of the invention.

As set out hereinabove, the invention is particularly concerned with horology components based on fragile materials, namely ones liable to break and generate significant debris which breaks free of the horology component and becomes spread through a horology movement. What is understood therefore by a fragile material is a non-ductile material which breaks without a prior and remanent plastic deformation. Such materials are preferably micro-machinable, namely obtained from micromanufacturing techniques involving photolithography. The invention is particularly well suited to silicon, in any form, for example including a doped or porous silicon, but could as an alternative also be adapted to other materials such as for example diamond, quartz, glass, silicon carbide, alumina-based or zirconia-based ceramic, fragile amorphous metals or sapphire. Such a horology component may be fully or almost fully formed from said fragile or brittle material, with the exception of its fine coating which will be described hereinafter. As an alternative, a horology component could be based on such a material, namely contain by weight at least 51% of such a material, or even at least 80% of such a material. It may therefore be a hybrid material which has a fragile or brittle effect. Through abuse of language the term "fragile material" will be used herein to denote the entire core of the horology component, including such parts of said core that may not directly be made from the fragile material on which the horology component is based.

The concept of the invention is to cover at least part of the surface of the horology component, preferably the surface of the most highly stressed in traction region of the horology component, with a multilayer coating comprising at least two layers of an elastic material separated by one layer of a material stronger than the elastic material. Such a coating forms a protective layer over the horology component to prevent debris from being scattered in the event of the component breaking, by holding the various pieces together. In the case of a coating extending over substantially the entire periphery of the horology component or over the regions that will be stressed in deformation, it is considered that such a coating encapsulates the horology component.

Figure 1:
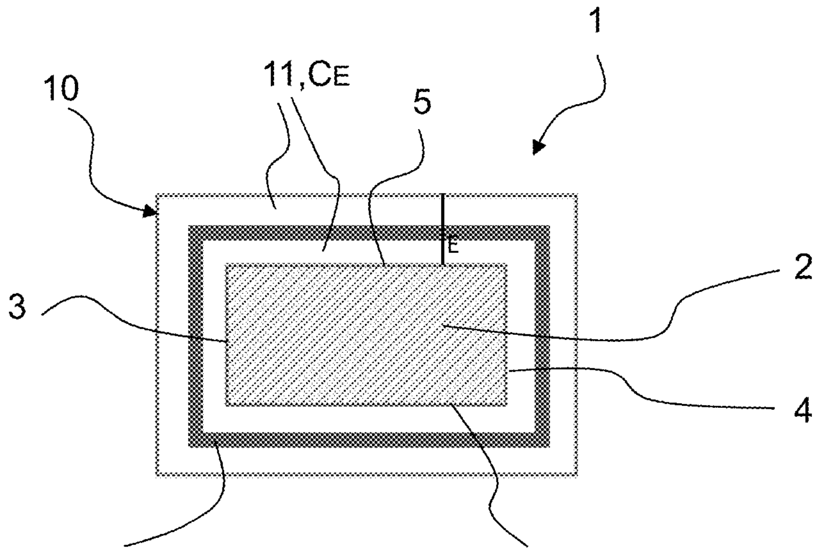

FIG. 1 schematically illustrates a horology component 1 according to a first embodiment of the invention. This horology component 1 comprises a main volume or core 2 made of silicon, originating for example from a step of cutting from a silicon wafer. It additionally comprises a coating 10 which extends over the entirety of its exterior surface, over its entire periphery, more particularly over the periphery of its core 2. According to one advantageous method of manufacture that will be described in detail hereinafter, this exterior surface is formed by the cutting of a wafer, and chiefly has three surfaces. A first surface 3 is substantially planar and corresponds to the upper face of the cut wafer. An opposite second surface 4, substantially planar and parallel to the first surface 3, corresponds to the lower face of the cut wafer. Finally, a third surface 5 forms a flank, which continuously connects the two aforementioned surfaces 3, 4.

The coating 10 is a multilayer coating which comprises a first layer CE, in contact with the silicon core 2 of the horology component 1, made of an elastic material. It comprises a third, outer, layer CE made from the same elastic material 11. These two layers are separated by a second layer CR made of a stronger material 12. In this first embodiment, the layers CE are made of parylene and the layer CR is made of aluminum oxide deposited using ALD.

Figure 2:
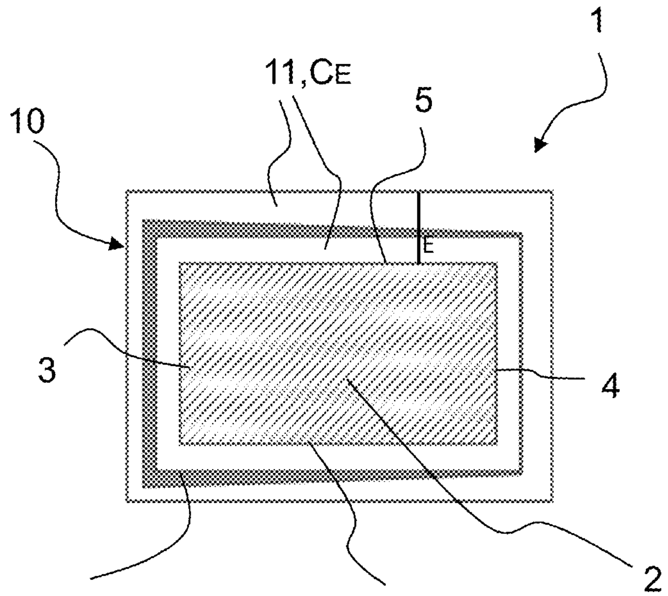

FIG. 2 illustrates a second embodiment which differs from the first in that the intermediate layer CR of the coating, made from a stronger material 12, from silicon oxide, has a thickness that is variable at the flank 5. This intermediate layer additionally has a thickness that is constant on the first and second surfaces 3, 4, this thickness being greater on the first surface 3 than on the second surface 4. The two layers CE of elastic material 11 complete this intermediate layer to form an overall coating of constant thickness. In this second embodiment, the layers CE are made of parylene and the layer CR is made of silicon oxide deposited using PVD.

In FIGS. 1 and 2, the thickness of the coating 10 is not shown to scale; it is greatly accentuated in order better to visualize this coating which in reality is very fine. Its thickness E is liable to vary within a certain range. In general, the coating 10 comprises at least one layer CE made of elastic material 11 of a thickness greater than or equal to 0.05 μm, or even greater than or equal to 0.3 μm. The coating 10 also advantageously comprises at least one layer CE of elastic material 11 of a thickness less than or equal to 5 μm, or even less than or equal to 3 μm. Finally, the sum of the thicknesses of the various layers CE of elastic material of the coating 10 is advantageously greater than or equal to 0.1 μm, or even 0.6 μm, and/or less than or equal to 20 μm, or even less than or equal to 12 μm. Note that the various layers CE of elastic material 11 may or may not have the same thickness. This thickness may or may not be variable.

Furthermore, a layer CR of stronger material 12 of the coating 10 has a thickness greater than or equal to 15 nm, or even greater than or equal to 30 nm. The coating 10 also advantageously comprises a layer of stronger material 12 of a thickness less than or equal to 150 nm, or even less than or equal to 100 nm, or even less than or equal to 70 nm. Finally, the sum of the thicknesses of the various layers CR of stronger material 12 is greater than or equal to 15 nm, or even greater than or equal to 30 nm, and/or is less than or equal to 450 nm, or even less than or equal to 300 nm, or even less than or equal to 210 nm.

To complement this, the materials of the coating 10 may differ from those used in the embodiments described. In any case, the elastic material 11 has an elastic modulus less than or equal to 10 GPa, or even less than or equal to 5 GPa, or even less than or equal to 3 GPa. As an alternative or in addition, the elastic material 11 has an elongation at break greater than or equal to 10%, or even greater than or equal to 20%, or even greater than or equal to 30%. This elastic material 11 may therefore be parylene or, as an alternative, a PTFE, an acrylic resin, silicone or a polymer from the urethane family. Various layers of elastic material 11 of the one same coating 10 may be made from the same elastic material or from different elastic materials.

Furthermore, the stronger material 12 is said to be "stronger" in comparison with the strength of the material referred to as being "elastic". It has an elastic modulus greater than or equal to 30 GPa, or even greater than or equal to 45 GPa, or even greater than or equal to 60 GPa. As an alternative, it has an elastic modulus comprised between that of the fragile material of the core of the horology component and that of the elastic material of the elastic layer. It advantageously has an elastic modulus greater than or equal to that of an adjacent layer of elastic material 11 increased by 50%. Thus, the invention can be implemented with any pair of materials respectively said to be "elastic" and "stronger" comparatively, this being defined by a difference in their elastic modulus, the stronger material having an elastic modulus greater than or equal to that of at least one adjacent layer of elastic material increased by 50%. This stronger material 12 may be a metal or an alloy or graphite or an oxide, more particularly silicon oxide or silicon nitride. Various layers of stronger material 12 of the one same coating 10 may be made from the same material or from a different material.

Naturally, the invention is not restricted to the embodiments described. Thus, the coating 10 may comprise any other number of layers than the three layers depicted. It may for example comprise at least two, or even at least three, or four, layers of elastic material 11 and at least one, or even at least two, or three, layers of stronger material 12. In order to limit the influence this has on the dimensions and behavior of the component, it advantageously comprises at most four layers of elastic material 11 and at most three layers of stronger material 12, but could comprise more of these. It advantageously comprises an alternation of layers of elastic material 11 and of layers of stronger material 12. More advantageously it comprises a first, inner, layer of elastic material 11 and a last, outer, layer of elastic material 11. The adjectives "inner" and "outer" are used with reference to any direction leading from the core 2 of the horology component 1 towards the outside of the horology component 1.

The invention is particularly beneficial in the case of a horology component 1 selected from a toothed wheel, an escapement wheel, a hand, an impulse pin, a pallet, a lever, a pallet stone, a flat spring, such as a spiral spring, a system involving a flexible blade or some other component having a spring function.

Figure 3:
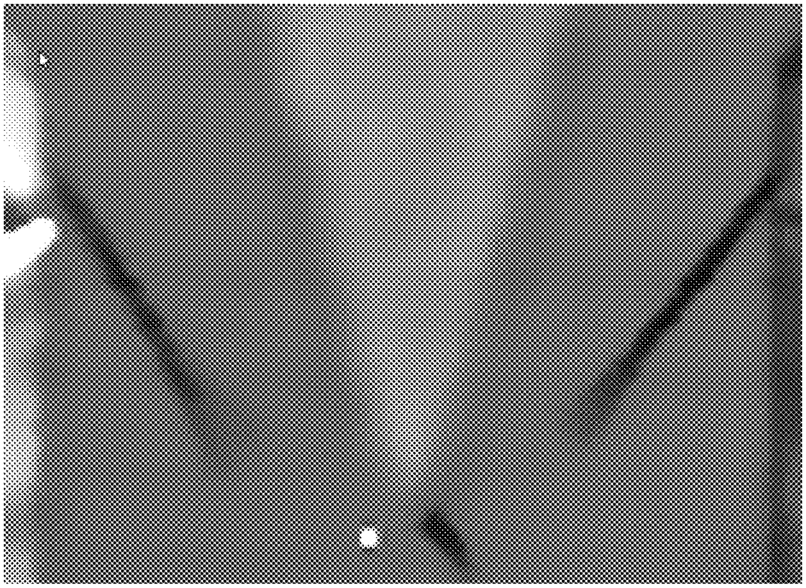
FIG. 3 depicts an enlargement of a photograph of a test specimen at the moment of its breakage, made of fragile material covered with a coating according to the embodiment of the invention.
Figure 4:
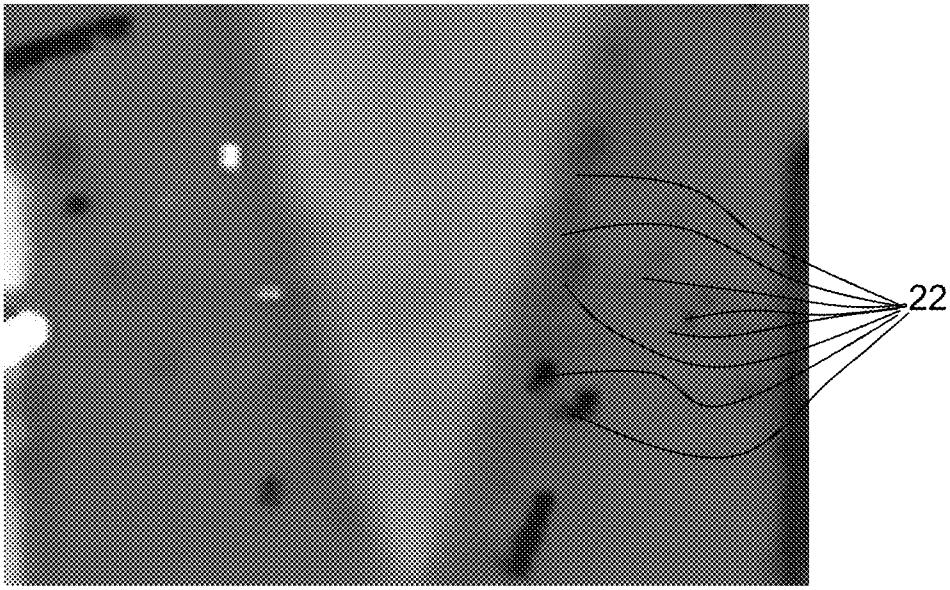
FIG. 4 depicts an enlargement of a photograph of a test specimen at the moment of its breakage, made of fragile material, similar to that of FIG. 3 but without the coating according to the embodiment of the invention.

FIGS. 3 and 4 illustrate the particular effect of a layer of elastic material 11 on a horology component 1 made of silicon. FIG. 3 illustrates the breakage of a silicon test specimen covered with a coating according to the second embodiment as illustrated in FIG. 2. FIG. 4 illustrates by comparison the breakage of the same silicon oxide test specimen without a coating. As can be seen in FIG. 4, a great amount of debris 22 is scattered. By contrast, the same test specimen covered with a layer according to the second embodiment makes it possible to prevent this scattering of debris, as illustrated in FIG. 3. A first advantage of using several layers of parylene is that the effect of the coating becomes more reliable: if one layer is damaged, there is theoretically an effect guaranteed by another layer.

Furthermore, at least one layer of parylene is not in direct contact with the outside, and is protected from potential external attack by at least one more rigid layer of the coating.

Comparative bending tests were conducted on silicon test specimens obtained by DRIE cutting from a silicon wafer, according to the methods known to those skilled in the art. Note that because of the fragile nature of the material, the same treatments applied to the one same test specimen result in different results from one identical horology component to another theoretically experiencing the same stress loadings. For this reason, it is necessary to perform tests on batches of identical test specimens, and then perform a statistical analysis thereof in order to determine whether or not an effect is present.

Figure 5:
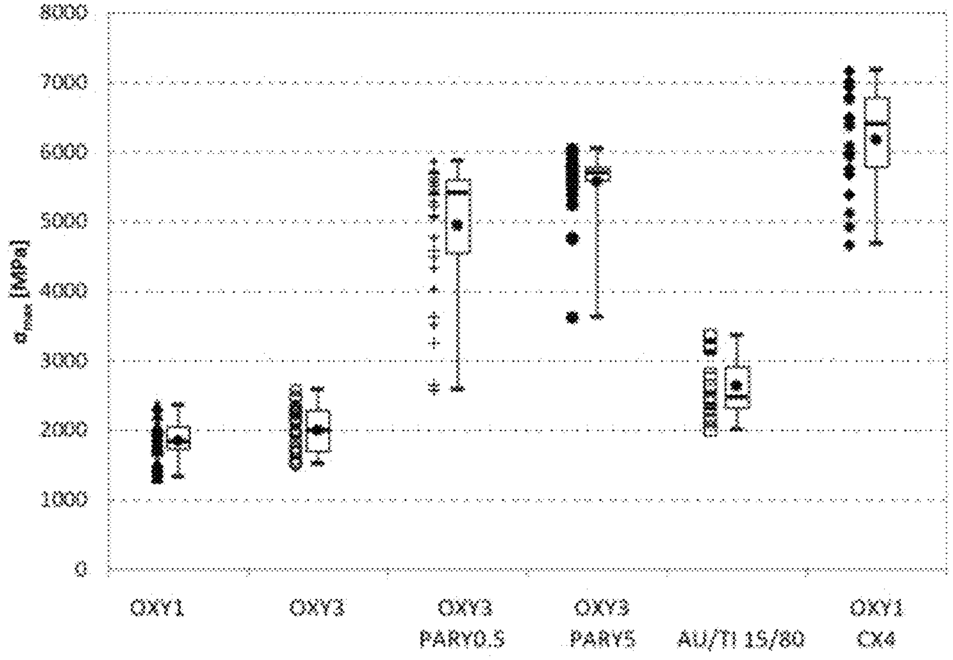
FIG. 5 depicts the strength obtained on various batches of horology components, evidencing the positive results obtained by the implementation of an embodiment of the invention.

The results obtained for six different batches of test specimens are illustrated in FIG. 5. The bending strength, indicated on the ordinate axis, of each component (test specimen) of each batch was measured. This figure illustrates, notably for each batch, the mean, minimum and maximum breaking strength.

The first two batches OXY1 and OXY3 relate to 30 test specimens comprising silicon oxide, having a layer of silicon oxide at the surface of 1 μm and 3 μm respective thicknesses. The mean value of the bending strength of these two batches is around 2000 MPa. Furthermore, in the event of breakage, all these test specimens generate a great amount of scattered debris.

The next two batches correspond to test specimens similar to batch OXY3 but covered with a pure, single-layer and uniform coating of parylene, with respective thicknesses of 0.5 μm and 5 μm. Surprisingly, the addition of such a coating of a low-strength elastic material makes it possible to significantly increase the breaking strength of the test specimens. Specifically, the mean strength is of the order of 5000 MPa.

The fifth batch corresponds to test specimens made of silicon covered with a metallic coating, comprising a tie layer of titanium with a thickness of 15 nm and a 80 nm layer of gold. This strong coating makes it possible to achieve a slight increase in mean strength by comparison with that of the first two batches, but which is markedly inferior than the two batches using a parylene coating. Furthermore, such a coating does not hold onto the debris when the test specimens break.

Finally, the final batch corresponds to the second embodiment of the invention, comprising a coating consisting of alternations of four layers of parylene of approximately 1 μm, and of three intermediate layers of silicon oxide with a thickness of 0.01 μm, for a total coating thickness that varies between 3.7 and 4.7 μm. It would appear that the mean strength of this batch exceeds 6000 MPa with minimum values above 4000 MPa: the invention therefore makes it possible to optimize the strength of a horology component. The invention therefore also relates to a horology component having a mean strength greater than or equal to 6000 MPa and/or having a minimum strength greater than or equal to 3000 MPa, or even greater than or equal to 4000 MPa. Furthermore, the invention makes it possible to limit the scattering of debris.

Finally, it would therefore appear that a coating combining a flexible material (an elastic material as defined hereinabove) with a stronger material (likewise as defined hereinabove) allows the synergy between the two materials to be put to use in order not only to address the technical problem of preventing the scattering of debris in the event of breakage, which is an effective protective effect afforded by the elastic material, but also at the same time makes it possible to optimize the strength of the horology component, notably by the addition of a material stronger than the elastic material within the thickness of the coating 10. This highly advantageous behavior was unforeseeable and is therefore surprising.

The invention also relates to a horology movement and to a timepiece each per se, comprising one or more horology components as described hereinabove.

The method for manufacturing a horology component according to the invention comprises a first phase of manufacturing a rough form of a horology component, in a known way. For example, this first phase may comprise an initial step of sourcing a substrate made of a fragile micro-machinable material. This substrate is, for example, a silicon wafer. During a subsequent step, the wafer, notably at least one of its two faces referred to as the upper and lower faces, is covered with a protective coating, for example with a photosensitive resin. The method continues with a step of forming a pattern in the protective coating. The pattern is produced by creating openings through the layer of photosensitive resin. The protective coating forming openings constitutes a protective mask. A step of etching the silicon wafer through the protective mask, notably using deep reactive ion etching (DRIE), then allows openings to be made in the silicon in line with the opening or openings of the mask, so as to obtain a rough form of a horology component made of silicon. As an alternative, such a rough form of a horology component may be formed by any method other than the one mentioned hereinabove, for example using a laser cutting technique. The rough form obtained forms the core 2 of the horology component 1. It has a shape very close to that of the final horology component.

The invention is concerned with a second phase of manufacture, which consists in depositing a coating as described hereinabove on all or part of the surface of said rough form.

The step of depositing a coating is performed by alternating the depositing of layers of elastic material and of stronger material respectively.

This deposition step may be performed uniformly, by evaporation, CVD or ALD. As an alternative, it may be performed using a directional technique, such as a physical vapor deposition, also referred to by its abbreviation PVD, or a plasma-enhanced chemical vapor deposition, also referred to by its abbreviation PECVD, technique. In such a case, the coating flux is directed onto the first surface 3, at right angles to this surface. Such a directional method makes it possible to arrive at the second embodiment of FIG. 2.

The manufacturing method may comprise an intermediate step, before the step of depositing the coating, which consists in a step of thermally oxidizing and/or smoothing the surface of the rough form of the horology component. Thus, the core 2 of the horology component may be covered with an oxidation layer, for example a silicon oxide, prior to the deposition of the coating according to the invention.

The invention claimed is:

1. A horology component based on a fragile material,
wherein the component comprises at least one surface part of fragile material covered with a coating,
wherein the coating comprises at least two layers each made of a respective elastic material and separated by an intermediate layer made of a material stronger than the elastic material,
wherein a respective material of each of the at least two layers of elastic material is selected from the group consisting of parylene, PTFEs, acrylic resins, silicone, and polymers from the urethane family,
wherein the stronger material has an elastic modulus greater than or equal to an elastic modulus of the elastic material of each of the adjacent layers made of elastic material increased by 50%,
wherein the elastic modulus of the stronger material is lower than an elastic modulus of the fragile material,
wherein the layer of stronger material has a thickness greater than or equal to 15 nm and less than or equal to 150 nm.

2. The horology component as claimed in claim 1, wherein the elastic materials of the two layers of elastic material are a same material.

3. The horology component as claimed in claim 1, wherein the elastic material of the two layers of elastic material has an elastic modulus less than or equal to 10 GPa.

4. The horology component as claimed in claim 1, wherein at least one of the layers of elastic material has a thickness greater than or equal to 0.05 μm.

5. The horology component as claimed in claim 1, wherein the stronger material has an elastic modulus greater than or equal to 30 GPa.

6. The horology component as claimed in claim 1, wherein the stronger material is a metal or an alloy or an oxide or a nitride.

7. The horology component as claimed in claim 1, wherein the coating has at least one of the following characteristics:

the coating extends over an entire surface of a periphery of the fragile material;

each layer of elastic material has a constant thickness;

the layer or layers of stronger material has or have a thickness that is constant;

the coating comprises an alternation of layers of elastic material and of layers of stronger material;

the coating comprises at least three layers of elastic material and at least two layers of stronger material;

the coating comprises a first, inner, layer of elastic material and a last, outer, layer of elastic material.

8. The horology component as claimed in claim 1, wherein the fragile material is selected from the group consisting of silicon, silicon covered with oxide, quartz, glass, silicon carbide, alumina-based ceramics, zirconia-based ceramics, diamond, sapphire, and fragile amorphous metals.

9. The horology component as claimed in claim 1, wherein the component is selected from the group consisting of toothed wheels, escapement wheels, hands, impulse pins, pallets, levers, pallet stones, flat springs, flexible-blade systems, and other components having a spring function.

10. The horology component as claimed in claim 1, wherein the component has a mean bending strength at breakage greater than or equal to 6000 MPa.

11. A horology movement, wherein the movement comprises a horology component as claimed in claim 1.

12. A timepiece, wherein the timepiece comprises a horology component as claimed in claim 1.

13. The horology component as claimed in claim 1, wherein the elastic materials of the two layers of elastic material are different materials.

14. The horology component as claimed in claim 1, wherein the elastic material of each of the two layers of elastic material has an elongation at break greater than or equal to 10%.

15. The horology component as claimed in claim 1, wherein the sum of the thicknesses of the various layers of elastic material of the coating is greater than or equal to 0.1 μm.

16. The horology component as claimed in claim 6, wherein the stronger material is silicon oxide or silicon nitride.

17. The horology component as claimed in claim 1, wherein a total thickness of the layer or layers of stronger material of the coating is greater than or equal to 15 nm.

18. A horology component based on a fragile material, wherein the component comprises at least one surface part of fragile material covered with a coating, wherein the coating comprises at least two layers each made of a respective elastic material and separated by an intermediate layer made of a material stronger than the elastic material, wherein the stronger material has an elastic modulus (i) greater than or equal to an elastic modulus of the elastic material of each of the adjacent layers made of elastic material increased by 50%, and (ii) lower than an elastic modulus of the fragile material, wherein the layer of stronger material has a thickness greater than or equal to 15 nm and less than or equal to 150 nm, wherein the stronger material is silicon oxide or silicon nitride.

19. A horology component based on a fragile material, wherein the component comprises at least one surface part of fragile material covered with a coating, wherein the coating comprises at least two layers each made of a respective elastic material and separated by an intermediate layer made of a material stronger than the elastic material, wherein the stronger material has an elastic modulus greater than or equal to an elastic modulus of the elastic material of each of the adjacent layers made of elastic material increased by 50%, wherein the component is selected from the group consisting of toothed wheels, escapement wheels, hands, impulse pins, pallets, levers, pallet stones, flat springs, flexible-blade systems, and other components having a spring function, wherein a respective material of each of the at least two layers of elastic material is selected from the group consisting of parylene, PTFEs, acrylic resins, silicone, and polymers from the urethane family.

20. The horology component as claimed in claim 19, wherein the elastic material of the two layers of elastic material has an elastic modulus less than or equal to 10 GPa.

21. The horology component as claimed in claim 19, wherein the component has a mean bending strength at breakage greater than or equal to 6000 MPa.

22. The horology component as claimed in claim 19, wherein the elastic material of the two layers of elastic material has an elongation at break greater than or equal to 10%.

23. The horology component as claimed in claim 19, wherein the elastic materials of the two layers of elastic material are a same material.

* * * * *